United States Patent [19]

MacMillan et al.

[11] 4,304,032
[45] Dec. 8, 1981

[54] METHOD OF CAPACITOR MANUFACTURE

[76] Inventors: Deane B. MacMillan, 1119 Wheaton Dr., Troy, Mich. 48099; Carolyn L. Donigan, 685 Hickory Heights Dr., Bloomfield Hills, Mich. 48013

[21] Appl. No.: 135,044

[22] Filed: Mar. 28, 1980

[51] Int. Cl.³ ........................................... H01G 13/00
[52] U.S. Cl. ............................... 29/25.42; 264/271.1; 361/272
[58] Field of Search ............... 361/272, 308, 306, 310, 361/307; 174/52 PE; 264/272; 29/25.42

[56] References Cited

U.S. PATENT DOCUMENTS

| 3,060,356 | 10/1962 | Beyer | 174/52 PE |
| 3,155,766 | 11/1964 | Eichert | 174/52 PE |
| 3,231,798 | 1/1966 | McCutchen | 361/308 |
| 3,838,316 | 9/1974 | Brown | 174/52 PE X |
| 4,198,671 | 4/1980 | Donigan | 361/272 X |

FOREIGN PATENT DOCUMENTS

| 103399 | 5/1926 | Fed. Rep. of Germany | 361/306 |
| 1092571 | 11/1954 | France | 361/306 |
| 1281432 | 1/1960 | France | 361/310 |

Primary Examiner—Elliot A. Goldberg
Attorney, Agent, or Firm—Krass, Young & Schivley

[57] ABSTRACT

A capacitor assembly and method of manufacture is disclosed, the capacitor being of the type including a capacitor winding received into a capacitor housing cavity, with a pair of terminal contact straps each positioned in contact with an opposite face of the capacitor winding and along the upper surface of the housing adjacent the cavity. A cap overlying the capacitor winding, as well as the terminal, is provided by an injection molding of material by means including a molding die which compresses one of the contact straps which normally upwardly extend to enable positioning of the mold top plates over the housing recess during the molding process. Spring back of the contact allows the contact to return to its original position.

3 Claims, 4 Drawing Figures

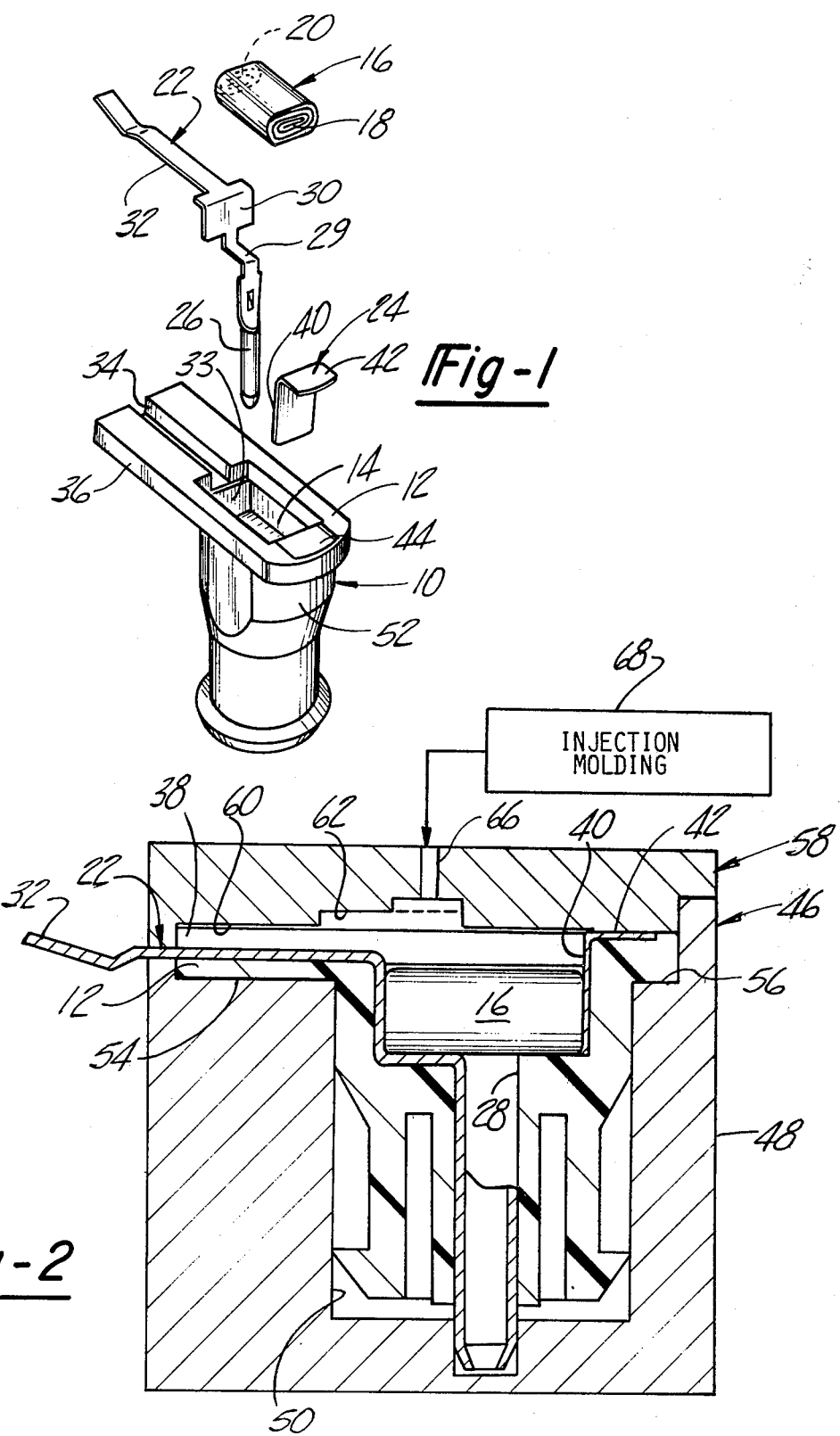

METHOD OF CAPACITOR MANUFACTURE

BACKGROUND DISCUSSION

Radio frequency suppression capacitors have many applications in automotive vehicles. Such capacitors have many configurations, but basically comprise a capacitor winding sealed within a capacitor housing and having contact blades or leads extending out of the housing for connection into the circuit into which the capacitor is to be employed.

Copending application Ser. No. 912,557, filed June 5, 1978, describes a capacitor of the type including a capacitor winding mounted within a molded housing in which a pronged terminal is utilized for making plug-in type installations and other contact portions passing out of the housing from contact with the capacitor winding. As described in detail in that application, the durability during in-service use of the capacitor is greatly enhanced by a molding technique wherein the capacitor cavity and the contact portions adjacent the cavity are overlain with a molded-in material. This insures a very effective and reliable sealing of the interior of the housing, important in the relatively harsh automotive application environment.

Such process also results in greatly reduced manufacturing costs over prior art approaches to this problem.

Some configurations of such capacitors include a contact spring tab, which extends at an upward inclination from the upper side of the molded housing. The presence of such spring tab has generally been regarded as requiring a separate molded cap to be assembled to the capacitor assembly with a sealing material or seam heating utilized in order to provide a sealing of the cap to the mating housing controls.

Such process results in significantly increased manufacturing costs, which is of great significance in the context of capacitors intended for automotive application due to the vast volume of production required. This also results in substantially increased incidence of failure due to imperfections occurring in the manufacturing process and also renders the capacitor assembly less resistant to weathering and high temperature conditions.

Accordingly, it is an object of the present invention to provide an improved molded capacitor assembly and method of manufacture thereof for capacitors of the general type including a molded plastic housing having a recess formed in the upper flanged surface thereof which recess is adapted to receive the molded capacitor windings and including capacitor terminals having end faces in contact with the end faces of the capacitor windings. The terminals have portions which extend to generally overlie the flanged upper surface of the molded housing with one of the terminals including an angled end portion which is adapted to provide a spring contact at installation, which the capacitor is provided with a molded top cap sealing the capacitor winding and recess as well as overlying a portion of the flanged housing portion to seal the capacitor assembly against the environment.

It is still a further object of the present invention to provide such method which is relatively simple and low in cost to implement such as to maintain the manufacturing cost of the assembly at a minimum.

SUMMARY OF THE INVENTION

These and other objects of the present invention, which will become apparent upon a reading of the following specification and claims, are achieved by the use of injection molding process, which injection molding die includes a die body having a cavity which receives the capacitor housing including an upper die plate through which the injection molding material is adapted to be injected. The upper die plate is configured to compress the upward projecting tab portion of the spring contact. The inside of the die top plate defines with the upper flange side of the molded housing and capacitor winding a mold cavity such that after injection of molding material a molded-in-place cap is created.

Upon removal of the capacitor assembly from the die set, the resilience of the tab portion allows spring back to its original position.

DESCRIPTION OF THE DRAWINGS

FIG. 1 is an exploded perspective view of the capacitor assembly components prior to molding in of the sealing cap.

FIG. 2 is a partially sectional view of the molded capacitor assembly in place in an injection die set just prior to injection of the top cap molding material.

DETAILED DESCRIPTION

Figure 3:
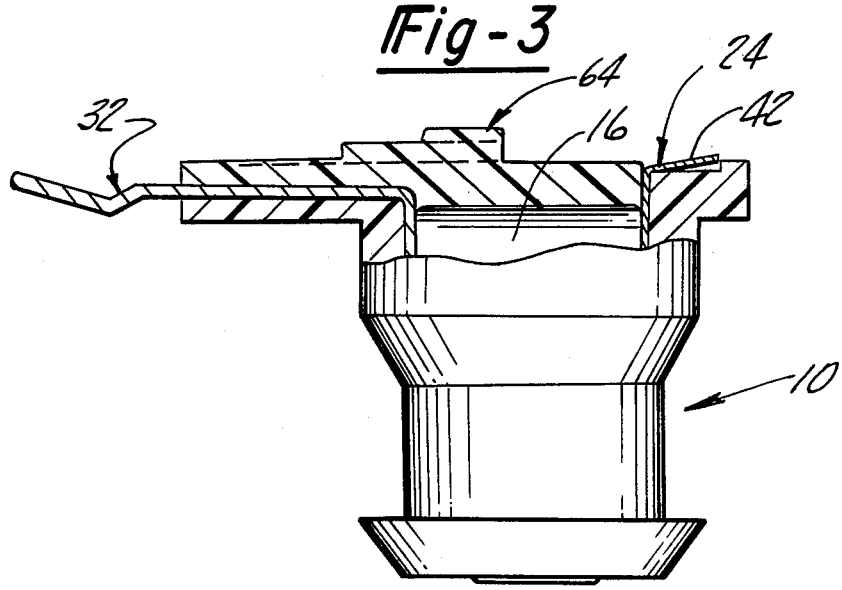
FIG. 3 is a partially sectional view of a completed capacitor assembly according to the present invention illustrating the molded cap in position.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, FIG. 1 shows in a perspective exploded view the major components of a capacitor assembly of the type with which the present invention is concerned. Such assembly includes a molded housing 10 which has an upper flanged side 12 into which is formed a recess 14, which is in turn adapted to receive a capacitor winding 16. In this instance, the capacitor winding 16 is mounted in a transverse orientation with respect to the length of the molded housing 10. That is, with the end faces 18 and 20 extending parallel or normally to the flanged side of the molded housing 10. Also included are a pair of contact elements for establishing electrical connections, a connector-terminal strap 22 and a spring grounding strap 24. The connector-terminal strap 22 includes a prong 26 which extends through a bore 28 (FIG. 2) formed beneath the recess 14 of the molded housing 10, and protrudes through the opposite end in order to provide a plug in connection of the capacitor assembly.

The connector-terminal strap 22 also includes a stepped section 29 which extends normally to the longitudinal axis of the prong 26 to form a contact face 30 against the end wall 33 of the recess 14, positioned in contact with the end face 20 of the capacitor winding 16.

A terminal section 32 is provided which extends out over the top of the molded housing 10 within a channel recess 34 formed in an extension 36 of the flanged side 12 with a clearance space 38 as best seen in FIG. 2.

The spring grounding strap 24 as noted includes a contact face 40 which is configured to extend into the interior of the recess 14 opposite the end wall 32 to be positioned in contact with the opposite end face 18 of the capacitor winding 16.

The contact face 40 is integral with an upwardly inclined spring tab 42 which normally is upwardly inclined (FIG. 4) extending at an acute angle with respect to the flanged side 12.

According to the concept of the present invention, a recess 44 is provided in the molded housing 10 which is configured and located to accommodate the spring tab 42 when it is compressed flat against the flanged side 12 of the molded housing 10. The purpose of such recess can be appreciated by reference to FIG. 2. In this view, the assembled components shown in FIG. 1 are positioned within an injection molding die 46 which includes a lower die section 48 containing a cavity 50 which just receives the body die section 52 of the molded housing 10 with the lower surface 54 of the flanged side 12 being positioned against a recess 56 formed in the upper face of the lower die section 48.

The injection molding die 46 also includes a top plate 58, provided with a recessed area generally indicated at 60 which defines a mold cavity together with the upper surfaces of the various capacitor assembly components in position in the lower die section cavity 50, i.e., the upper surface of terminal strap 32, capacitor winding 16, and the spring tab 42 of the spring grounding strap 24.

As best seen in FIG. 2, the top plate 58 recessed area 60 is configured so as to act on the upper surface of the spring tab 42 to compress and force the same down into the recess 44 provided in the molded housing 10. The resilience of material is sufficient to allow such bending of the spring section without causing permanent deformation thereof, i.e., is compressed within the elastic limit of this element.

Figure 4:
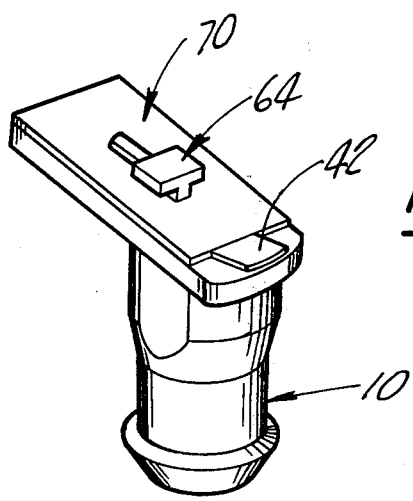
FIG. 4 is a perspective view of the capacitor assembly shown in FIG. 3.

The recessed area 60 also includes enlarged cavity areas 62 which are provided to form a suitable mechanical attachment feature indicated at 64 in FIGS. 3 and 4 which is adapted to provide engagement with a mating coupling structure (not shown).

Accordingly, after emplacement of the assembled components in FIG. 1 into the die cavity 50 and installation of the die top plate 58, suitable molten plastic material can be injected into the injection opening indicated at 66 by suitable injection molding apparatus (indicated by block diagram 68), causing the enlarged cavity 62 to be filled with plastic molding material.

The plastic composition of the molded housing 10 is such as to provide a secure weather-tight bond after solidification of the molding material injected into recessed area 60.

After cooling of the molded material and removal of the completed assembly from the injection molding die 46, a molded structure is provided completely sealing the internal components, particularly the capacitor winding 16, as well as providing a mechanical support of the various components. The injection molding material flows into and around the capacitor winding 16 into all of the crevices to afford maximum protection to this relatively vulnerable component.

At the same time, the spring tab 42 upon being released from contact with the top die plate 58, again resumes its normal upwardly extending position as shown in FIGS. 3 and 4 to provide suitable spring engagement with the mating coupling (not shown). The molded top cap 70 thus will afford maximum resistance to deterioration in the adverse automotive environment.

Accordingly, it can also be seen that the manufacturing process is very economical since a much simpler process is constituted by the procedure of simply molding the top cap 70 in place rather than separately manufacturing the interfitting top cap which must then be sealed or seam welded to the molded housing 10.

It can also be appreciated that the process is inherently more likely to produce a completely sealed bonded interfit of the top cap with the molded housing 10 to improve the reliability of the manufacturing process.

Accordingly, it can be appreciated that the above-recited objects of the present invention have been achieved by the method and capacitor assembly described herein.

The embodiments of the invention in which an exclusive property or privilege is claimed are defined as follows:

1. A method of manufacturing a molded capacitor of the type including a molded capacitor housing having a recess extending into a flanged side thereof and a capacitor winding disposed therein, a pair of connector straps having sections positioned in contact with a respective end face of said capacitor winding, at least one of said connector straps including a spring tab section extending from the said flanged side at an acute inclination thereof, said method comprising:

assembling said connector straps and capacitor winding into said capacitor housing;

molding a top cover in place over said flanged side and capacitor winding in said recess, said molding step including the steps of placing said assembled components into a molding die, said die including a top plate positioned over the assembled components and adapted for defining in part a die cavity corresponding to said top cover, said top plate further including a surface pressing said spring tab against said flanged side with said top plate in position, said molding step including the step of placing said top plate in position compressing said spring tab and injecting a plastic molding material into said cavity.

2. The method according to claim 1 wherein said capacitor components are configured with said recess surfaces retaining connector strap portions extending across said flanged side, wherein in said molding step said connector straps comprise in part a mold cavity, whereby said molding material forming said top cover molded over said strap sections thereof.

3. The method according to claim 2 further including forming a recess on said flanged side corresponding to said flange spring tab in said compressed position, whereat said step of placing said top plate in position compressing said spring tab into said flanged side recess.

* * * * *